July 15, 1941.                J. DI PALMA                2,249,119
                              AXLE PULLER
                           Filed Aug. 9, 1939
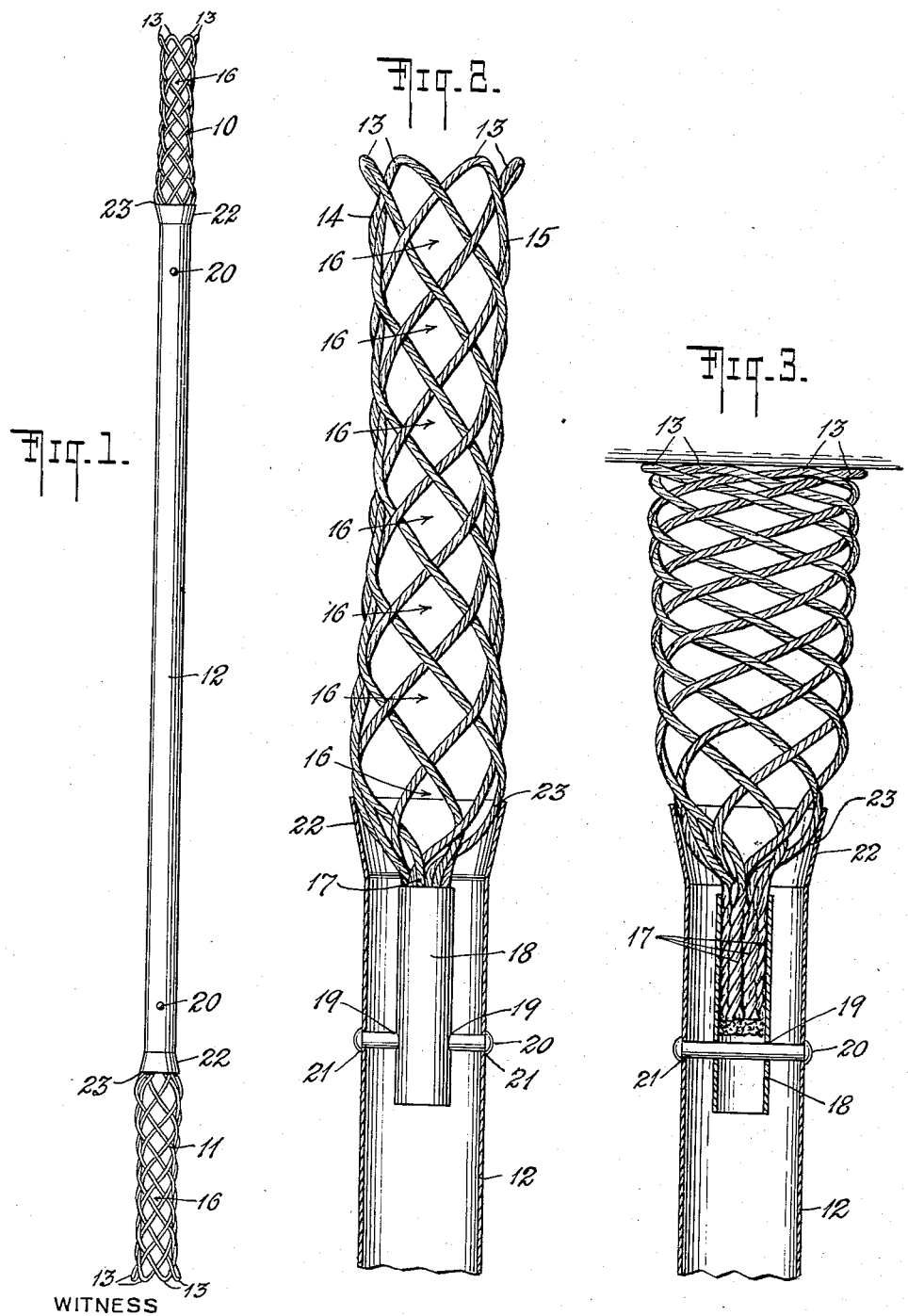
WITNESS
G. V. Rasmussen
INVENTOR
JOSEPH DI PALMA
BY
ATTORNEYS Patented July 15, 1941

2,249,119

UNITED STATES PATENT OFFICE 2,249,119

AXLE PULLER

Joseph Di Palma, Brooklyn, N. Y., assignor to Kellems Products Inc., New York, N. Y., a corporation of New York Application August 9, 1939, Serial No. 289,114

6 Claims. (Cl. 294—86)

This invention relates to a device for use in extracting from vehicles the inner ends of differential shafts which have become broken either through defects in the materials of which the shafts are constituted or other causes.

The differential shafts of a vehicle are usually housed in an axle casing whose openings at the outer ends of the differential shafts are too small to admit ordinary tools for the purpose of extracting broken parts of the shafts within the casing. Therefore when a differential shaft is broken, the usual procedure is to first remove the outer end of the shaft with the wheel and then extract the inner end of the shaft with a special tool which has been designed for this specific purpose.

The object of the present invention is to provide an axle puller which is of relatively simple, sturdy and inexpensive construction and which will reliably and successfully perform the functions for which it is designed.

An axle puller embodying the features of this invention is illustrated in the accompanying drawing in which Fig. 1 is a side elevational view of a preferred form of the axle puller; Fig. 2 is an enlarged detail view, partly in section, of one end of the structure shown in Fig. 1 and Fig. 3 is an enlarged detail view similar to Fig. 2 and illustrating the relation of the strands in the gripping portion of the puller when such portion is under an endwise compressive stress.

In the drawing the numerals 10 and 11 designate the gripping members at each end of the handle 12. Each of the gripping members 10 and 11 is composed of a plurality of strands made of wire such as galvanized aircraft wire of approximately 3/4 inch in diameter. The strands are folded intermediate their ends at 13 to form continuous loops at the open end of the grip, the two ends or sections 14 and 15 of each of such strands being extended toward the other end of the grip and spiralling in opposite directions about the longitudinal axis of the grip. The ends or sections 14 and 15 of the strands are interwoven or braided together to form an open meshed structure which may be considerably varied in diameter by endwise compression and extension thereof so that when expanded radially by endwise compression it may be readily placed over and upon the ends of shafts having varying diameters and that when the compression force is removed it will automatically contract radially to frictionally engage the outer surfaces of the shaft. When an endwise pull or force is thereupon exerted tending to extend the open meshed structure, the strands of the latter will tighten upon the shaft and thereby secure a firm frictional grip. The greater the endwise force or pull acting upon the open meshed structure, the greater will be the gripping action of the latter upon the shaft. The grips 10 and 11 are made of different sizes to accommodate axles or shafts of varying dimensions. For example, if the axle puller is to be used for passenger cars, particularly, one of the grips may be made so that it has a diameter of seven-eighths of an inch and a length of five inches, the strands being woven in single weave so that the number of diamond-shaped spaces 16 in each longitudinally extending row of such spaces is nine, while the other grip may be made one inch in diameter and six inches long with eight diamond-shaped spaces 16 in each longitudinally extending row. If the axle puller is to be used for extracting broken shafts from buses and trucks, one gripping member may be made one and one-half inches in diameter and six inches long with eight diamond-shaped spaces 16 in each longitudinally extending row, while the other gripping member may be made one and seven-eighths inches in diameter and six and one-half inches long with nine diamond-shaped spaces 16 in each longitudinally extending row of such spaces.

The ends 17 of the strands are twisted together in pairs, each pair of wires being preferably connected together by three complete twists. The twisted ends 17 of the strands are bunched together and inserted into a piece of tubing 18 made of steel or other suitable material in which they are soldered or otherwise permanently secured. The twisted ends of the strands are made sufficiently long and are inserted far enough into the tubing 18 to assure a firm connection as between the gripping member and the tubing. For example, the twisted ends of the grips may be cut so that they are approximately one-quarter as long as the woven portion of the grip and inserted into the tubing 18 for almost their entire length. The tubing 18 is provided with a pair of diametrically opposed apertures 19, 19 just below the ends 17 of the strands, through which extends a rivet 20, the ends of such rivet extending through diametrically opposed apertures 21, 21 provided in the handle 12 within an end of which the tubing 18 is axially disposed.

The handle 12 is preferably made out of cold rolled electrically welded steel tubing and is flared at each end to provide the frusto-conically shaped shoulders 22, 22. Each of the tubings 18 is so arranged within the handle 12 that its outer end is adjacent to the inner or narrow end of the proximate shoulder 22. Prior to the attachment of the units comprising the grips or gripping members 10 and 11 and their associated tubings 18, 18, the grips are preformed so that the portions of the weave adjacent to the tubings 18 and within the region indicated by the reference numeral 23 in Figs. 2 and 3 of the drawing, are tapered to approximately the same extent as are the shoulders 22. Thus when the tubings 18, 18 are anchored in proper position within the ends of the handle 12, the tapered portions 23 of the gripping members seat on the interior surfaces of the flared shoulders 22 and such shoulders together with the anchored tubings 18 function to hold the gripping members 10 and 11 against endwise or lateral movement and to rigidify such members so that they will not bend in a longitudinal direction under the stresses raised when a gripping member is forced into engagement with a shaft while at the same time enabling the main body of such gripping member to expand and to contract radially.

In using the device it will be clear that when one of the gripping members is inserted into an axle casing in order to remove a broken part of a differential shaft and the end of the gripping member comes into engagement with the broken end of the shaft portion, the pushing force exerted on the handle by the mechanic will cause the gripping member to be compressed and thereby expanded radially to enable such end of the shaft to enter into the open meshed structure of such member, the continuous loops 13 at the open end of the grip facilitating this operation. Due to the seating of the tapered portion 23 of the gripping member on the adjacent flared shoulder 22, such member can be pushed firmly into engagement with the shaft and will not bend or buckle longitudinally under such pushing pressure, the tapered portion 23 by reason of the confining action of the flared shoulder 22 maintaining its shape and not collapsing to any appreciable extent as will the main body portion of the gripping member. As is illustrated in Fig. 3 of the drawing, the rigidifying effect on the gripping member is such that under a pushing pressure longitudinally of the member such as to change the angular relation of the strands of the main body portion so that the diamond-shaped openings of such portion are almost closed, the strands in the tapered portion will remain relatively unchanged and maintain the arrangement of the portions of the strands in such tapered part for a distance of approximately one diamond space away from the end of the shoulder 22, the diameter of such portion however being gradually increased however under such force to that of the main body portion of such gripping member. When the gripping member has been inserted into position on the shaft the cessation of the pushing force will cause the strands of such member to contract radially and frictionally engage with the exterior surfaces of the inserted portion of the shaft. When the mechanic pulls the device to extract the broken shaft the gripping member will be extended thereby causing such member to grip the shaft more firmly, the greater the pulling force that is required to be exerted on the handle by the mechanic in order to remove the shaft the more firmly will the gripping member engage the shaft so that once the gripping member is in engagement with the shaft there is little likelihood of its becoming separated therefrom.

It will be apparent from the foregoing that the device is well suited for the purposes for which it was devised, the construction thereof being relatively simple, easily manufactured and sturdy enough to withstand forces of many hundreds of pounds. Tests have demonstrated that the gripping members are the strongest portions of the device, the tubings 18 being the first to give way under excessive pressures way beyond that ever required in removing a shaft from a vehicle. The gripping action obtained on the shaft is accomplished by a simple straightforward movement without the necessity of rotating the device and when the axle is once gripped it can be removed by a simple longitudinal pull.

While I have hereinabove described and illustrated in the drawing the preferred embodiment of my invention, it will be understood that various changes in the form and arrangement of the parts may be made without departing from the spirit of the invention or the scope of the appended claims.

I claim:

1. A pulling device comprising a handle adapted to be grasped by the hands of an operator and having at one end a longitudinally extending recess, means positioned on said handle at the outer end portion of said recess and having internal outwardly flaring surfaces providing a tapered seat which communicates at its inner narrow end with said recess, said means being of rigid construction and permanently fixing the cross-sectional area enclosed by said tapered seat, a gripping member positioned at one end in said recess and projecting outwardly beyond said end of the handle, said gripping member being composed of a plurality of strands interwoven about a common axis to form an open-meshed structure, the portions of the strands of such structure positioned in said recess being bunched together and the portion of said woven structure extending through said rigid means being formed to seat on said tapered seat under compressive forces applied lengthwise of said structure, the rigid fixed surfaces of said seat during the application of said compressive forces being adapted to rigidify the meshed structure against longitudinal bending and to enable the structure to be compressed to increase its transverse dimensions under such compressive forces without buckling, and means positioned in said recess at a point inwardly of said tapered seat and securing the bunched portions of the strands in said recess to said handle.

2. A pulling device such as is claimed in claim 1, in which the means having the rigid fixed internal seating surfaces is integral with the material of which said handle is constituted and the means for securing the strands in the recess of the handle comprises a fastener member securing such bunched portions of the strands together and being disposed within the recess beyond the inner narrow end of said tapered seat to enable the portions of the strands extending through the rigid fixed surfaces of said seat to move relative to the latter, and means securing said fastener member to said handle.

3. A pulling device comprising an elongated handle adapted to be grasped by the hands of an operator and having at one end a longitudinally extending recess, the interior surfaces of said handle forming the outer end portion of said recess being of rigid construction and flaring outwardly to form a tapered seat, a gripping member positioned at one end in said recess and projecting outwardly beyond said end of the handle, said gripping member being composed of a plurality of strands interwoven about a common axis to form an open meshed structure, the ends of said strands disposed in said recess being bunched together and the portion of said woven structure extending through the end portion of said recess being formed to seat on said tapered seat under compressive forces applied lengthwise of said structure, said rigid tapered seat during the application of such compressive forces being adapted to rigidify the meshed structure against longitudinal bending and to enable the structure to be compressed to increase its transverse dimensions under such compressive forces without buckling, a metal fastener axially disposed in said recess in spaced relation to the interior walls of said recess and permanently embracing the bunched ends of said strands, and means securing said metal fastener to said handle.

4. A pulling device such as defined in claim 3 in which said metal fastener comprises a short piece of tubing enclosing the bunched ends of said strands and being disposed in said recess so that the outer end thereof is adjacent to the inner end of said tapered seat.

5. A pulling device comprising an elongated metal tube forming a handle adapted to be grasped by the hands of an operator, one end of said tube being flared outwardly to form a rigid frusto-conically shaped shoulder, a gripping member connected to said end of said tube and projecting outwardly therefrom, said gripping member being composed of a plurality of strands interwoven about a common axis to form an open meshed structure, the ends of said strands at one end of said structure extending through said shoulder and into said tube, the terminal ends of said strands in said tube being bunched together and the portion of said woven structure extending through said shoulder being formed to seat on the interior surfaces of said shoulder under compressive forces applied lengthwise of said structure, said rigid tapered seat during the application of such compressive forces being adapted to rigidify the meshed structure against longitudinal bending and to enable the structure to be compressed to increase its transverse dimensions under such compressive forces without buckling, a small tubing enclosing said bunched strand ends and being positioned in the end of said tube inwardly of the inner end of said shoulder and in spaced relation to the interior surfaces of said handle, solder material permanently securing said strand ends and tubing together and a rivet extending through said handle tube and tubing and permanently securing the same together in spaced relation.

6. A pulling device comprising an elongated metal tube forming a handle, one end of said tube being flared outwardly to form a frusto-conically shaped shoulder, a gripping member connected to said end of said tube and projecting outwardly therefrom, said gripping member being composed of a plurality of strands interwoven about a common axis to form an open meshed structure, the ends of said strands at one end of said structure extending through said shoulder and into said tube, the portion of said woven structure extending through said shoulder being formed to seat on the interior surfaces of said shoulder under compressive forces applied lengthwise of said structure and the terminal ends of said strands in said tube being bunched together, a small tubing enclosing said bunched strands and being permanently secured thereto, said tubing being disposed in said tube so that its longitudinal axis is common with the longitudinal axis of the handle tube and said tubing having a greater length than the bunched strand ends enclosed thereby and fastening means penetrating said tubing below the terminal ends of said bunched strands and securing the same to said handle tube.

JOSEPH DI PALMA.